United States Patent Office 3,026,323
Patented Mar. 20, 1962

3,026,323
SALTS OF TRIBASIC ACIDS
Rubin J. Schacter, 263 Primrose Ave.,
Mount Vernon, N.Y.
No Drawing. Filed Mar. 22, 1960, Ser. No. 16,661
12 Claims. (Cl. 260—287)

The present invention relates to a family of new molecules which evidence useful and highly beneficial restoration of the balance of the autonomic nervous system. These new agents are competent to correct disorders brought about by the imbalance of the sympathetic and parasympathetic nervous systems due to overstimulation of one system or suppression of the other system or both. Since these agents are competent to restore the proper balance of the autonomic nervous system by an interplay of the two branches of the autonomic nervous system, wherever the autonomic system exerts an effect, they are useful in alleviating moods of depression, restoring physical stamina and enhancing the will to perform daily tasks with vigor. These agents are also useful in correcting malfunction of organs innervated by the autonomic nervous system such as gastric secretion, bronchospasm associated with asthma, motility of stomach, intestine, uterus, gall bladder and other similar manifestations. One of their principal advantages resides in the fact that they enable the simultaneous action of what otherwise would be separate medicaments, since in effect they comprise a single salt of three active bases.

The compounds of the present invention are attained by creating a tripartite salt of a pharmaceutically acceptable tribasic acid, with three bases. The general formula being

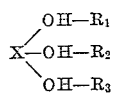

The pharmaceutically acceptable tribasic acids, being the backbone of the molecule are citric, phosphoric, isocitric and tricarballylic acids.

$R_1$ is a tropine alkaloid such as atropine, tropine, homatropine, hyoscine and scopolamine; these bases being parasympathetic inhibitors.

$R_2$ is a beta phenylethylamine, substituted or unsubstituted, with sympathomimetic properties such as amphetamine, ephedrine, epinephrine, mephentermine, arterenol, N-isopropyl arterenol, phenylephrine, propadrine, aludrine, nor-epinephrine and naphthalozine. One may use the D, L, or DL forms in preparing these compounds.

$R_3$ is a tertiary amino ester of an aromatic acid, substituted or unsubstituted, such as cocaine, procaine, tetracaine, piperocaine, lidocaine, butethamine, hexylcaine, dibucaine, butacaine, larocaine and meticaine. These bases inhibit the activity of monoamine oxidase.

A preferred method of preparing the salts is to dissolve the bases sequentially in alcohol (e.g. ethanol) in order of their least solubility. The tribasic acid is then introduced; crystals or an oil are then formed and may be separated from the alcohol by conventional means. The resulting product has the characteristic of, and is believed to be a true salt in each instance.

The examples which follow have been incorporated to illustrate the present invention and are not to be viewed as exhaustive thereof.

EXAMPLE 1

Ephedrine tropine dibucaine phosphate 0.248 g. of ephedrine was dissolved by stirring in 5 cc. of 95% ethanol, then 0.515 g. of dibucaine was dissolved in the alcohol, and finally 0.211 g. of tropine was added and dissolved therein. To this alcoholic solution was added 0.145 g. of phosphoric acid. A precipitate formed. The solution was evaporated, acetone added and then cooled. The crystals which formed were removed by filtration. They appeared white, slightly hygroscopic and were soluble in water. The precipitate had a melting point of 160–162 degrees C. and an intravenous $LD_{50}$ in mice of 200 mg./kg. of body weight. Ephedrine tropine dibucaine phosphate was administered to six persons with symptoms of fatigue, muscular weakness, and varying degrees of mental depression. Two of the patients in this group had endogenous depression of moderate severity, while the other four had symptoms of fatigue with difficulty in exerting sustained physical and mental effort. The drug was dissolved in simple syrup and the dose adjusted so that each teaspoonful (5 ml.) contained 5 mg. of ephedrine tropine dibucaine phosphate. One or two teaspoonsful were administered twice daily: one on arising in the morning, and the other in mid-afternoon, with a period of about six hours elapsing between doses. All of the patients showed improvement in the symptoms and there were no side effects, such as dryness of the mouth, increased blood pressure, blurring of vision, or gastro-intestinal symptoms. One patient who was 30% overweight, thought that appetite was somewhat reduced. Significantly, improvement was noted in each case, without exception. The ephedrine tropine dibucaine phosphate thus formed has the following structure:

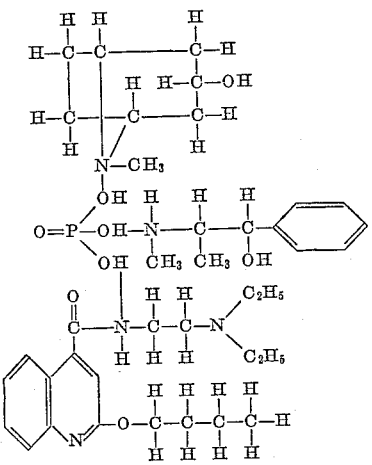

EXAMPLE 2

Ephedrine Atropine Procaine Citrate 2.894 g. of atropine was dissolved in 10 cc. of 95% ethanol; to this was added 2.36 g. of procaine and stirred until dissolved; then 1.65 g. of ephedrine was added.

Finally 2.1 g. of citric acid was added to the alcoholic solution. An oily substance was formed which separated from the solvent upon cooling. Ephedrine atropine procaine citrate thus formed has the following structure:

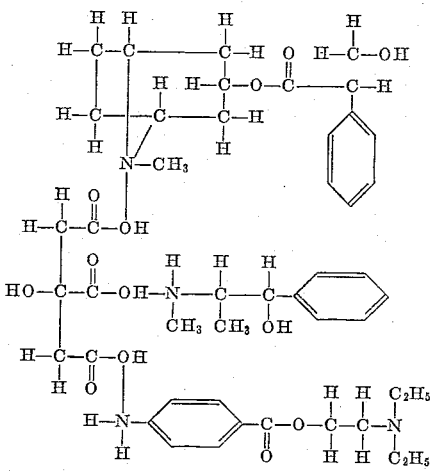

EXAMPLE 3

*Amphetamine Tropine Procaine Phosphate*

1.352 g. of amphetamine was dissolved in 10 cc. of 95% ethanol followed by dissolution therein of 2.36 g. of procaine, which in turn was followed by 1.4 g. of tropine. When solution was complete 1 g. of phosphoric acid was added. A precipitate was formed. The crystals were separated by filtration and dissolved in hot alcohol. Cooling this solution in ice box for overnight, white crystals separated. The crystals were water soluble and had a melting point of 180–190 degrees C.

Microanalytical data:

|   | Calculated | Found |
|---|---|---|
| C | 59.0 | 58.92 |
| H | 8.35 | 8.00 |
| N | 9.18 | 8.59 |

Two groups of patients were placed on therapy employing amphetamine tropine procaine phosphate. One group (I) of six had sufficiently severe depressions (endogenous or reactive) to warrant treatment with a monoamine oxidase inhibitor such as phenelzine (beta-phenylethylhydrazine dihydrogen sulphate) and to make comparison between the two drugs. The other group (II) of seventeen were representative of a large ambulatory group seen in practice who complain chiefly of fatigue, fatiguability with or without mild feelings of depression, subjective feelings of weakness, low spirits and lack of zest.

Group I patients with one exception, evidenced improvement in mood, increase in energy level and noted less subjective sense of fatigue. Dosages were in the 7–10 mg. level given twice daily on arising and six hours later. The effects were noted within an hour and lasted throughout the day. In one case of endogenous depression the effect was immediate and spectacular with a listless, tearful, completely apathetic patient showing the disappearance of crying spells, improved mood and considerable increment in energy and ambition. After two weeks on amphetamine tropine procaine phosphate, the six patients were placed on phenelzine (15 mg. T.I.D. for five days, B.I.D. for one to two weeks thereafter) with disappointing results there being a lack of beneficial effects, three of the patients complained of dizziness after one to two weeks, while one complained of moderate nausea. The five who had had beneficial results with amphetamine tropine procaine phosphate unanimously preferred it, without qualification, to phenelzine. The second non-responder to amphetamine tropine procaine phosphate did not respond either to phenelzine or imipramine. The responses may be graded as, one which gave no response; one which gave a mild but definite response; three which gave a good-subjective response with positive feelings of well-being and spontaneous desire for more activity and outlet, while one, gave an excellent to maximum type of response with a sense of exhilaration.

With respect to the patients in group II, all seventeen with fatigue states noted improvement, generally coming on within one or two hours, continuing for from four to six hours without noticeable subsequent letdown. Improvement in these cases comprised evidence on reports of increased energy, increased sense of well-being, decreased sense of fatigue, ability to think or work harder, elevation of mood, which in some cases was described as exhilaration or feelings of happiness. Although all seventeen patients reported improvement, one of the patients had no substantial response at the 7 mg. B.I.D. level, while one gave a mild but definite response, nine gave a good subjective response with positive feelings of well-being and a spontaneous desire for more activity and outlet and four gave an excellent to maximum type of response with a sense of exhilaration. Of the twelve or so patients who had had previous experience with amphetamine sulphate and similar drugs, all but one expressed the positive preference for amphetamine tropine procaine phosphate, calling attention to the fact that with it they felt energized without such side effects as loss of appetite, palpitations, sense of jitteriness, dryness of the mouth, or headachey feelings. In general, side effects with amphetamine tropine procaine phosphate were unexpectedly few. Of the twenty-three patients in groups I and II, there were only three or possibly four cases who reported definite side effects. One case evidenced inconstant palpitations. In one or two cases there seemed to be an increased tendency toward a pre-existing constipation and one case reported a post drum letdown. In none of the cases was there any complaint of dizziness, nausea, headache or abdominal pains, jitteriness, impaired appetite or insomnia. In two cases, a slight increase of the pulse rates on the order of ten to twelve beats per minute resting were observed. There were no significant changes in blood pressure, nor difficulties in accommodation of pupillary size, nor difficulties in urinatio nor other autonomic effects. Generally, it seems that amphetamine tropine procaine phosphate is outstandingly impressive in the common so-called neurotic, fatigue-depressed states. Amphetamine tropine procaine phosphate made as above set forth has the following structure:

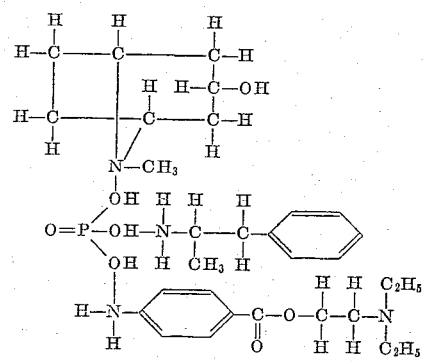

EXAMPLE 4

*Ephedrine Atropine Procaine Phosphate*

If in Example 2 phosphoric acid is substituted for citric acid, the salt which results is ephedrine atropine procaine phosphate. It has an intravenous LD$_{50}$ in mice of 100 mg./kg. The structural formula of this molecule is as follows:

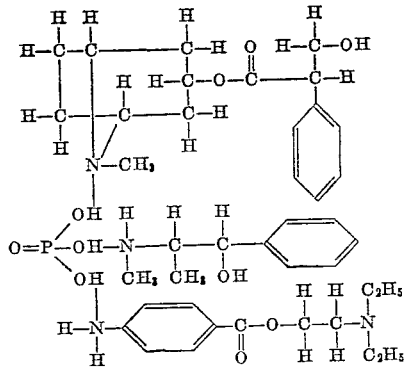

EXAMPLE 5

Ephedrine Tropine Procaine Phosphate

If in Example 1 there is substituted for dibucaine, procaine, then the resulting molecule which is formed is ephedrine tropine procaine phosphate. To twenty-four patients 5 ml. doses (dissolved in simple syrup) were administered two, three, or four times daily. Of the seven patients who were suffering from ulcer, all seven showed improvement on the medication, showed a recurrence of symptoms when the medication was halted and showed improvement again when the medication was again administered. Of four psychosomatic patients only one showed improvement. Of nine patients suffering from functional G-I disturbance, all nine reported definite improvement. Of two suffering from ulcerative colitis, one evidenced improvement. Neither of the two patients with cholelithiasis evidenced improvement. Obviously then, the drug is of undemonstrated utility in cases of psychosomatic disturbances and in cases of cholelithiasis, as well as ulcerative colitis, but would appear to be uniformly substantially effective in cases involving ulcers and functional G-I disturbances. A surprising absence of side effects such as blurring of vision, dryness of the mouth, constipation and the like, was surprisingly noted. The molecule has the following molecular structure:

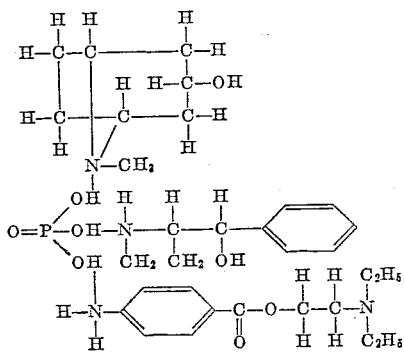

EXAMPLE 6

Ephedrine Tropine Procaine Citrate

If in Example 2 tropine is substituted for atropine, then the molecule formed is ephedrine tropine procaine citrate, an oily material which is solid at 4 degrees C. and has the following molecular structure:

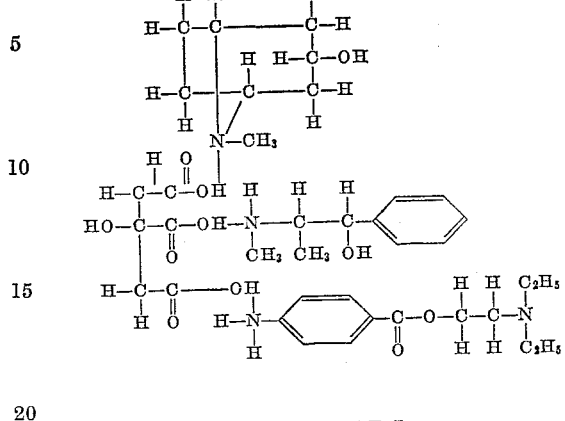

EXAMPLE 7

Amphetamine Tropine Dibucaine Phosphate

If in Example 1 amphetamine is substituted for ephedrine, then there is formed amphetamine tropine dibucaine phosphate. In a clinical study of amphetamine tropine dibucaine phosphate fifty patients received the drug in a simple syrup wherein 1 cc. corresponded to a dose of 5 mg. In this form, the drug had no sensible taste except for the sweetness of the syrup which was not masked and had no local anesthetic action on the tongue. At the outset of the study 5 mg. of the drug were administered every four hours but it was noticed that the onset of the action was rapid, e.g. nausea or gastralgia being relieved usually within a very few minutes, but the duration was shorter than four hours. Hence, in most cases the dose was subsequently raised to 5 mg. every two or three hours. Unit doses of 10 mg. were well tolerated but not sustained for longer periods than the 5 mg. dosages. 20 mg. dosages usually caused dizziness or drowsiness or both and, therefore, were not administered on a sustained basis. The nature and number of the cases and the results may be found in the following table:

| Nature of case | Number of cases | Satisfactory | Equivocal | Unsatisfactory |
|---|---|---|---|---|
| 1. Peptic ulcer | 14 | 10 | 1 | 2 |
| 2. Gastro-enteritis | 22 | 18 | 0 | 4 |
| 3. Biliary dyskinesia | 5 | 2 | 1 | 2 |
| 4. Pregnancy nausea | 3 | 3 | 0 | 0 |
| 5. Tic douloureux | 2 | 1 | 0 | 1 |
| 6. Osteoarthritis | 2 | 1 | 1 | 0 |
| 7. Migraine | 1 | 1 | | |
| 8. Fibrositis | 1 | 1 | | |

The drug demonstrated itself to be a valuable spasmolytic agent for use in gastroenterologic practice. None of the complaints usually encountered with parasympatholytic drugs such as mouth dryness, constipation or other "anti-cholinergic" symptoms were found in the employment of amphetamine tropine dibucaine phosphate. The definite anti-nauseant and anti-gastralgic effect of this drug was unexpected.

In another study in which seven patients were given 5 mg. doses T.I.D. or Q.I.D., the five ulcer patients all registered improvement (in one case a hemorrhaging ulcer stopped hemorrhaging), the one case of a spastic G-I tract likewise registered while the case of abnormal magenblase registered no improvement. The molecule has the following structure:

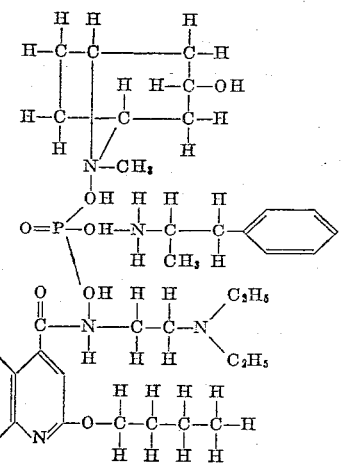

EXAMPLE 8

*Mephentermine Atropine Procaine Citrate*

If in Example 2 mephentermine is substituted for the ephedrine, then the salt resulting is mephentermine atropine procaine citrate, with a molecule of following structure:

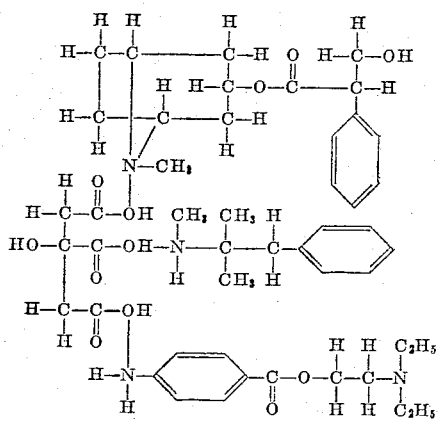

EXAMPLE 9

*Ephedrine Atropine Dibucaine Phosphate*

If in Example 4 the dibucaine is substituted for the procaine, then the salt resulting is ephedrine atropine dibucaine phosphate. Clinical studies with atropine ephedrine dibucaine phosphate indicate that it is competent to relieve chronic fatigue and mild depression although side effects such as dryness of the mouth and a feeling of fullness in the epigastrium may be encountered. The molecule has the following structure:

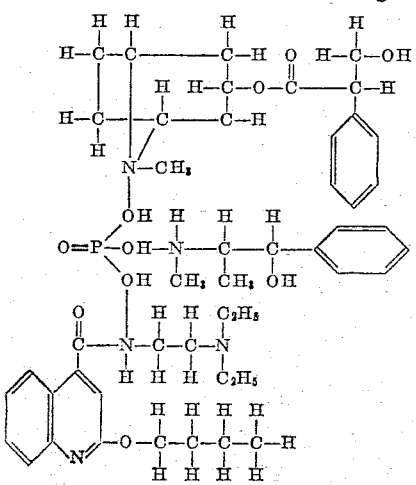

EXAMPLE 10

*Ephedrine Atropine Dibucaine Citrate*

If in Example 9 citric acid is substituted for the phosphoric acid, then the salt resulting is ephedrine atropine dibucaine citrate. In a series of five patients, two of which were suffering from ulcer, two from diarrhea and colitis, and one which evidenced a psychosomatic spastic pylorus and colon to whom 1.2 mg. unit dosages were administered B.D.I., all but the patients suffering from psychosomatic difficulties evidenced improvement. In the case of one of the patients suffering from diarrhea, when medicaiton was discontinued for three days diarrhea reoccurred and when medication was renewed, the diarrhea condition improved. Unexpectedly, there was an absence of side effect such as blurring of vision, dryness of the mouth, constipation and the like. The molecule has the following structure:

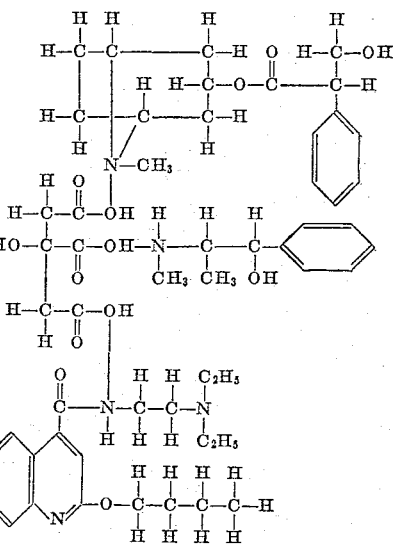

EXAMPLE 11

*Amphetamine Tropine Procaine Tricarballate*

If in Example 3 the tricarballylic acid is substituted for the phosphoric acid, then the salt resulting is amphetamine tropine procaine tricarballate, an oily material whose molecule has the following structure:

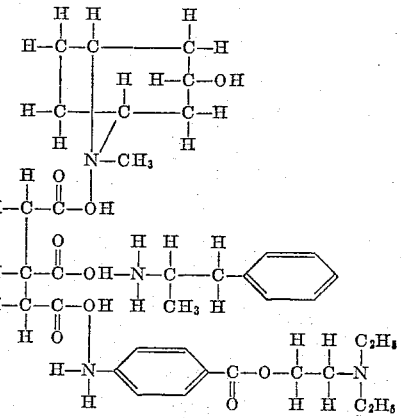

It will thus be obvious that what has been discovered is a whole family of molecules which permits the active moities of bases intended to restore balance to the autonomic nervous system, to reach their respective loci of action substantially simultaneously.

This application is a continuation-in-part of applicant's co-pending application Serial Number 685,354, now abandoned.

It is not desired to be limited except as set forth in the following claims, the above description being by way of illustration of the invention.

What is claimed is:

1. A salt of a tribasic acid wherein the acid is selected from the group consisting of citric, isocitric, phosphoric and tricarballylic acid and the base moieties consist of different bases, one being selected from each of the following groups, a tropine alkaloid selected from the group consisting of atropine L, D and LD, homatropine, tropine, hyoscine and scopolamine, a sympathomimetic amine selected from the group consisting of the dextro, laevo and racemic forms of epinephrine, norepinephrine, ephedrine, mephentermine, arterenol, N-isopropyl arterenol, amphetamine, phenylephrine, propadrine, aludrine and naphazoline and an amine oxidase inhibitor selected from the group consisting of cocaine, procaine, tetracaine, piperocaine, lidocaine, butethamine, hexylcaine, dibucaine, butacaine, larocaine and meticaine.

2. Ephedrine tropine dibucaine phosphate.
3. Ephedrine atropine procaine citrate.
4. Amphetamine tropine procaine phosphate.
5. Ephedrine atropine procaine phosphate.
6. Ephedrine tropine procaine phosphate.
7. Ephedrine tropine procaine citrate.
8. Amphetamine tropine dibucaine phosphate.
9. Mephentermine atropine procaine citrate.
10. Ephedrine atropine dibucaine phosphate.
11. Ephedrine atropine dibucaine citrate.
12. Amphetamine tropine procaine tricarballate.

References Cited in the file of this patent
UNITED STATES PATENTS

| | | |
|---|---|---|
| 2,628,185 | Lewenstein | Feb. 10, 1953 |
| 2,840,562 | Fein | June 24, 1958 |